(12) United States Patent
Xu et al.

(10) Patent No.: US 10,884,559 B2
(45) Date of Patent: Jan. 5, 2021

(54) TOUCH PANEL, TOUCH METHOD OF THE SAME, AND TOUCH APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yuanjie Xu, Beijing (CN); Shan Gao, Beijing (CN)

(73) Assignees: CHENGDU BOE OPTOELECTRONICS CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 2 days.

(21) Appl. No.: 16/386,531

(22) Filed: Apr. 17, 2019

(65) Prior Publication Data
US 2019/0243489 A1 Aug. 8, 2019

Related U.S. Application Data

(63) Continuation-in-part of application No. PCT/CN2018/071541, filed on Jan. 5, 2018.

(30) Foreign Application Priority Data

Jun. 28, 2017 (CN) .......................... 2017 1 0505669

(51) Int. Cl.
*G09G 3/36* (2006.01)
*G06F 3/044* (2006.01)
(Continued)

(52) U.S. Cl.
CPC ............ *G06F 3/044* (2013.01); *G06F 3/0443* (2019.05); *G06F 3/0448* (2019.05);
(Continued)

(58) Field of Classification Search
CPC .. G09G 3/36; G09G 5/00; G09G 3/30; G09G 3/10; G06F 3/041; G06F 3/045; G06F 3/038
See application file for complete search history.

(56) References Cited

U.S. PATENT DOCUMENTS 8,421,757 B2 * 4/2013 Suzuki ............... G06F 3/0418
178/18.06
9,007,315 B2 4/2015 Kim et al.
(Continued)

FOREIGN PATENT DOCUMENTS

CN 103389822 A 11/2013
CN 103777803 A 5/2014
(Continued)

OTHER PUBLICATIONS

First Office Action dated Sep. 4, 2019; Corresponding to Chinese Application No. 201710505669.X; English Translation Attached.
(Continued)

*Primary Examiner* — Pegeman Karimi
(74) *Attorney, Agent, or Firm* — Nath, Goldberg & Meyer; Joshua B. Goldberg

(57) ABSTRACT

A touch panel, a touch method of the touch panel, and a touch apparatus are provided. The touch panel includes: a touch layer including a plurality of touch areas; a pre-touch detection module configured to detect, among the plurality of touch areas, a touch area opposite to a touch object, the touch object being at a distance from the touch layer, the distance being greater than 0; and a pre-touch feedback module configured to generate a feedback signal based on the detected touch area. The feedback signals corresponding to the touch areas are different.

14 Claims, 4 Drawing Sheets

(51) Int. Cl.
*G06F 3/0488* (2013.01)
*G06F 3/041* (2006.01)

(52) U.S. Cl.
CPC ........ *G06F 3/0488* (2013.01); *G06F 3/04186* (2019.05); *G06F 2203/04108* (2013.01)

(56) References Cited

U.S. PATENT DOCUMENTS

| | | | |
|---|---|---|---|
| 10,324,533 B2 | 6/2019 | Niu | |
| 2004/0150668 A1* | 8/2004 | Myers | G06F 3/0421 715/771 |
| 2013/0300677 A1 | 11/2013 | Kim et al. | |
| 2014/0240618 A1* | 8/2014 | Oraw | G06F 3/044 349/12 |
| 2015/0160778 A1* | 6/2015 | Kim | G06F 3/044 345/174 |

FOREIGN PATENT DOCUMENTS

| | | |
|---|---|---|
| CN | 104407728 A | 3/2015 |
| CN | 106527807 A | 3/2017 |
| EP | 3035398 A1 | 6/2016 |
| JP | 2016535894 A | 11/2016 |

OTHER PUBLICATIONS

International Search Report; Application No. PCT/CN2018/071541; dated Apr. 12, 2018; English Translation Attached.

\* cited by examiner

TOUCH PANEL, TOUCH METHOD OF THE SAME, AND TOUCH APPARATUS

CROSS-REFERENCE TO RELATED APPLICATIONS

This is a Bypass Continuation of PCT/CN2018/071541, filed on Jan. 5, 2018, an application claiming the benefit of priority to Chinese Patent Application No. 201710505669.X, filed on Jun. 28, 2017, the entire contents of which are hereby incorporated by reference.

TECHNICAL FIELD

The present disclosure relates to the field of touch technologies, and particularly, to a touch panel, a touch method of the touch panel, and a touch apparatus.

BACKGROUND

With fast development of display technologies, touch panels have been widely used in people's living. The touch panels include irregular-shaped touch panels. The operating environment of the touch panel includes a special environment, such as a driving environment, a dark environment and a noisy environment.

SUMMARY

Some embodiments of the present disclosure provide a touch panel. In some embodiments, the touch panel includes: a touch layer including a plurality of touch areas; a pre-touch detection module configured to detect, among the plurality of touch areas, a touch area opposite to a touch object, the touch object being at a distance from the touch layer, the distance being greater than 0; and a pre-touch feedback module configured to generate a feedback signal based on the detected touch area. The feedback signals corresponding to the plurality of touch areas are different.

In some embodiments, the feedback signal includes an optical signal. The optical signals corresponding to the plurality of touch areas are light having different colors.

In some embodiments, the pre-touch feedback module includes a plurality of electroluminescent elements arranged at a side of the touch layer, the plurality of electroluminescent elements are in a one-to-one correspondence with the plurality of touch areas, an orthographic projection of each of the plurality of electroluminescent elements on the touch layer is within a corresponding one of the plurality of touch areas, and the plurality of electroluminescent elements emit light having different colors.

In some embodiments, the plurality of touch areas and the plurality of electroluminescent elements are provided only in a part of the touch panel.

In some embodiments, a number of the plurality of touch areas is four.

In some embodiments, the plurality of touch areas and the plurality of electroluminescent elements are provided throughout an entire of the touch panel.

In some embodiments, each of the plurality of touch areas has at least one self-capacitive electrode, each of the at least one self-capacitive electrode is electrically coupled with the pre-touch detection module, and the pre-touch detection module is configured to detect the touch area opposite to the touch object based on a change in capacitance of each self-capacitive electrode.

In some embodiments, the touch panel further includes a display panel, the touch layer is arranged at a light exiting side of the display panel, and the plurality of electroluminescent elements are arranged between the display panel and the touch layer.

In some embodiments, the display panel is configured to have a plurality of display areas, the plurality of display areas are in a one-to-one correspondence with the plurality of touch areas and display respective contents after a system is initiated.

In some embodiments, the plurality of touch areas are arranged in rows and columns.

In some embodiments, among the plurality of touch areas, one touch area is arranged at a centre of the touch layer while the remaining touch areas are arranged to surround the one touch area.

In some embodiments, the pre-touch detection module includes a detection sub-module configured to detect the touch object; and a determination sub-module configured to determine, among the plurality of touch areas, a touch area to be touched by the touch object as the touch area opposite to the touch object.

In some embodiments, the pre-touch detection module includes a detection sub-module configured to detect the touch object; and a determination sub-module configured to determine, among the plurality of touch areas, a touch area to be touched by the touch object as the touch area opposite to the touch object, based on the change in capacitance of each self-capacitive electrode.

Some embodiments of the present disclosure provide a touch method of a touch panel, and the touch panel includes any one of the touch panels described herein.

In some embodiments, the touch panel includes a touch layer having a plurality of touch areas, a pre-touch detection module, and a pre-touch feedback module, and the method includes steps of: detecting, by using the pre-touch detection module, a touch area opposite to a touch object when the touch object is at a distance from the touch layer, the distance being greater than 0; and controlling the pre-touch feedback module to generate a feedback signal based on the detected touch area. The feedback signals corresponding to the plurality of touch areas are different.

In some embodiments, the pre-touch feedback module includes a plurality of electroluminescent elements arranged at a side of the touch layer, the plurality of electroluminescent elements are in a one-to-one correspondence with the plurality of touch areas, an orthographic projection of each of the plurality of electroluminescent elements on the touch layer is within a corresponding one of the plurality of touch areas, the plurality of electroluminescent elements emit light having different colors from each other, and the step of controlling the pre-touch feedback module to generate a feedback signal based on the detected touch area includes controlling one of the plurality of electroluminescent elements corresponding to the detected touch area to emit light.

In some embodiments, each of the plurality of touch areas has at least one self-capacitive electrode, each of the at least one self-capacitive electrode being electrically coupled with the pre-touch detection module, and the step of detecting, by using the pre-touch detection module, a touch area opposite to a touch object includes detecting whether or not a sum of changes in capacitance of the at least one self-capacitive electrode included in each touch area is within a predetermined variation range; determining one touch area as the touch area opposite to the touch object when only the sum of changes in capacitance corresponding to the one touch area is within the predetermined variation range; and determining one touch area corresponding to a maximum sum of changes in capacitance as the touch area opposite to the touch object when sums of changes in capacitance corresponding to a plurality of touch areas are respectively within the predetermined variation range.

Some embodiments of the present disclosure provide a touch apparatus including any one of the touch panels described herein.

BRIEF DESCRIPTION OF THE DRAWINGS

The drawings are for providing a further understanding of the present disclosure, constitute as a part of the specification, and are for explaining the present disclosure together with the following specific embodiments, but are not for limiting the present disclosure, in which.

DETAILED DESCRIPTION

Hereinafter, specific embodiments of the present disclosure will be described in conjunction with the accompanying drawings. It should he noted that the specific embodiments described herein are merely for explaining and illustrating the present disclosure, but are not for limiting the present disclosure.

Figure 1:
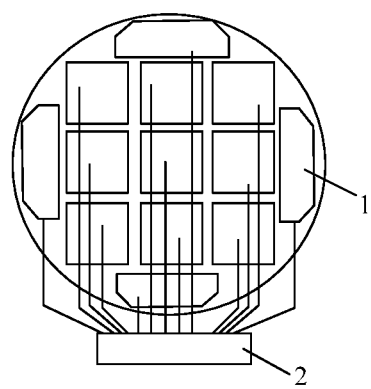
FIG. 1 is a structural schematic diagram illustrating a touch panel in the related art.
Figure 2:
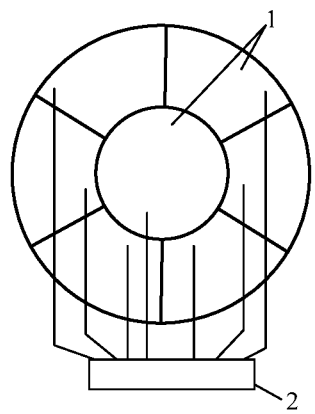
FIG. 2 is a structural schematic diagram illustrating another touch panel in the related art.

With fast development of display technologies, touch panels have been widely used in people's living. The touch panels include irregular-shaped touch panels. The operating environment of the touch panel includes a special environment, such as a driving environment, a dark environment and a noisy environment. However, faulty operations frequently occur when touches are performed on the irregular-shaped touch panel or under the special environment. FIG. 1 is a structural schematic diagram illustrating a touch panel in the related art. As illustrated in FIG. 1, the touch panel includes touch electrodes 1 having different sizes and a touch chip 2, which are electrically coupled through leads. In the touch panel as illustrated in FIG. 1, because the touch electrodes 1 located at the peripheral locations and the other touch electrodes 1 have different sizes and shapes, faulty touches are likely to occur. For this reason, a touch panel having another structure has been proposed in the related art. FIG. 2 is a structural schematic diagram illustrating another touch panel in the related art. As illustrated in FIG. 2, a plurality of touch electrodes 1 at peripheral positions are designed as a plurality of sectors having a same size and shape and arranged to surround a touch electrode 1 at the centre. However, since a touch position is determined by a touch circuit 2 based on a position of a touch electrode 1 having a maximum change in capacitance when the structure as illustrated in FIG. 2 is employed, a faulty touch may also occur when the touch position is at a boundary of two touch electrodes 1, as the changes in capacitance of the two touch electrodes 1 may be the same or close to each other. Moreover, when a touch is performed while driving or a touch is performed in a special environment such as a dark environment or a noisy environment, a faulty touch may likely occur as it is hard to accurately position a finger on a screen.

Accordingly, the present disclosure provides, inter alia, a touch panel, a touch method of the touch panel, and a touch apparatus that obviate one or more of the problems due to limitations and disadvantages of the related art. As an aspect of the present disclosure, there is provided a touch panel. The touch panel includes: a touch layer including a plurality of touch areas; a pre-touch detection module configured to detect a touch area opposite to a touch object, the touch object being at a distance from the touch layer, the distance being greater than 0; and a pre-touch feedback module configured to generate a feedback signal based on the detected touch area. The feedback signals corresponding to the touch areas are different from each other.

Figure 3:
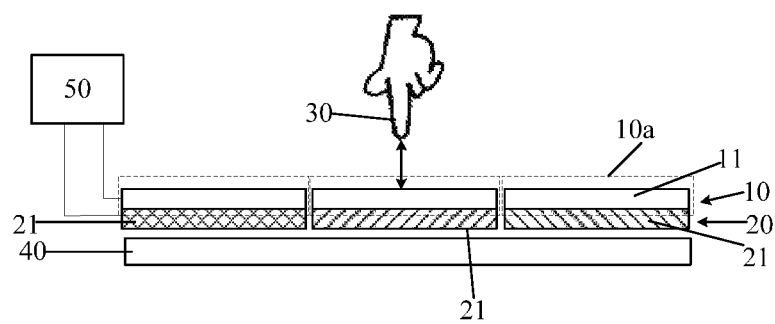
FIG. 3 is a schematic diagram of performing a touch on a touch panel according to embodiments of the present disclosure.

FIG. 3 is a schematic diagram of performing a touch on a touch panel according to some embodiment of the present disclosure. As illustrated in FIG. 3, the touch panel includes a touch layer 10, a pre-touch detection module 50 and a pre-touch feedback module 20. The touch layer 10 includes a plurality of touch areas 10a. Only three touch areas 10a are schematically illustrated in FIG. 3, and it should not be construed as a limitation to the present disclosure. Moreover, the pre-touch detection module 50 (including the sub-modules therein) may be, for example, in form of a semiconductor device, a circuit, an application-specific integrated circuit, a chip, a processor or the like, or the pre-touch detection module 50 may be integrated with an existing touch chip. The pre-touch detection module 50 is configured to detect a touch area 10a (e.g., the middle one of the three touch areas 10a in FIG. 3) opposite to a touch object 30, which is above and within a predetermined distance range from the touch layer 10 and not in contact with the touch layer 10. The touch area 10a opposite to the touch object 30 is detected when the touch object 30 is in the predetermined distance range above the touch layer 10. The touch object 30 is not in contact with the touch layer 10, and thus a minimum value of the predetermined distance range is greater than 0. The pre-touch feedback module 20 is configured to generate a feedback signal based on the detected touch area 10a. For example, the pre-touch detection module 50 may be electrically coupled to the pre-touch feedback module 20. When the pre-touch detection module 50 detects different touch areas 10a, the pre-touch feedback module 20 generates different feedback signals. The feedback signals corresponding to the respective touch areas 10a are different from each other. It should be understood that the feedback signal includes a human recognizable signal.

As used herein, the term "above" refers to an upper side in FIG. 3, i.e., a touch side of the touch layer. The touch object 30 may be an object for performing a touch operation, such as a finger or a touch pen, but the present disclosure is not limited thereto. The touch object 30 may be any object as long as a signal indicating an area of the touch layer 10 opposite to the touch object can be generated when the object is close to or in contact with the touch layer 10. Optionally, the predetermined distance range may be from approximately 5 mm to approximately 20 mm. As used herein, the term "approximately" is used for indicating that the value modified by the term is within an allowable error range.

It should also be noted that the touch area 10a opposite to the touch object 30 may be understood as a touch area opposite to a centre (e.g., a geometric centre) of a bottom of the touch object 30. When the touch object 30 is located right above only one touch area 10a, the one touch area 10a is the touch area opposite to the touch object 30. When the touch object 30 is located right above a boundary of a plurality of (e.g., two or more of) touch areas 10a, the touch area 10a having a maximum overlapped region with an projection of the touch object 30 on the touch layer 10 is the touch area 10a opposite to the touch object 30.

The pre-touch detection module 50 is capable of detecting the touch area 10a opposite to the touch object 30 when the touch object 30 comes into the predetermined distance range above the touch layer 10, and the pre-touch feedback module 20 is capable of generating a corresponding feedback signal based on the touch area 10a detected by the pre-touch detection module 50. During the operation of the touch panel according to the present disclosure, even before a touch object such as a finger or a touch pen comes into contact with the touch layer 10, an area of the touch layer 10 that is to be touched by the touch object 30 can be detected in advance by the pre-touch detection module 50, and the pre-touch feedback module 20 generates a corresponding feedback signal, such that the user can recognize in advance which one of the touch areas 10a is to be touched based on the feedback signal. Once the touch area 10a is not a touch area 10a that is intentionally to be touched, the user can correct his/her touch action in time to prevent a faulty touch from occurring.

The specific form of the feedback signal is not limited in the present disclosure, as long as it can be recognized by the user. For example, the feedback signal may be an acoustical signal or a vibration signal. For another example, the feedback signal may include an optical signal, in order that the user can make a quick determination on a touch area 10a above which the finger is located based on the feedback signal, in a complex (e.g., dark, noisy, or vibration) environment. The pre-touch feedback module 20 is configured to generate light having different colors when the pre-touch detection module 50 detects different touch areas 10a. As such, when the touch panel is used in an on-board display, for example, a user can see the color of feedback light out of the corner of his/her eye, without moving the eye off the driving direction, thereby recognizing in advance a position to be touched. Here, it should be noted that the number of the different colors (as well as the number of the touch areas 10a and the number of the feedback signals) is not limited in the present disclosure, as long as the user can recognize a touch area from among the plurality of touch areas through the light having color. In some embodiments, the number of the different colors is at least 2, for example, from 2 to 10, from 10 to 20, from 20 to 30, from 30 to 50, or from 50 to 100. Depending on actual needs, those skilled in the art could set any number of the different colors without departing from the protection scope of the present disclosure.

As illustrated in FIG. 3, the touch panel in some embodiments further includes a display panel 40. For example, the display panel 40 may be a liquid crystal display panel or an organic light emitting display panel. In some embodiments, as illustrated in FIG. 3, the touch layer 10 is arranged at a light exiting side of the display panel 40. Optionally, the pre-touch feedback module 20 is located at a display area of the display panel 40. Optionally, the pre-touch feedback module 20 is located at a non-display area of the display panel 40. In some embodiments, as illustrated in FIG. 3, the pre-touch feedback module 20 includes a plurality of electroluminescent elements 21 arranged at a side of the touch layer 10, and the plurality of electroluminescent elements 21 are in a one-to-one correspondence with the touch areas 10a. An orthographic projection of each of the electroluminescent elements 21 on the touch layer 10 is within a corresponding one of the touch areas 10a, and the electroluminescent elements 21 emit light having different colors from each other. In this way, the user can determine in advance a touch position to be touched based on not only the color of light emitted from the pre-touch feedback module 20, but also a position from which the light is emitted. In FIG. 3, different dashed boxes denote that the electroluminescent elements 21 emit light having different colors.

In some embodiments, as illustrated in FIG. 3, the electroluminescent elements 21 are provided between the display panel 40 and the touch layer 10. In an alternative embodiment, the electroluminescent elements 21 may be arranged at a side of the touch layer 10 away from the display panel 40. It should be understood that the electroluminescent elements 21 should allow light to pass therethrough when the electroluminescent elements 21 are not emitting light, so as not to block images displayed on the display panel 40. In some embodiments, each of the electroluminescent elements 21 includes a quantum dot light emitting element or an organic electroluminescent element. In an embodiment, each of the electroluminescent elements 21 includes at least one first color (e.g., red) light emitting unit (e.g., red organic light emitting diode (OLED)), at least one second color (e.g., green) light emitting unit (e.g., green OLED) and at least one third color (e.g., blue) light emitting unit (e.g., blue OLED). In this case, each of the electroluminescent elements 21 can emit light having a desired color, and the present touch panel can realize more colors recognizable by human eyes, such as dark blue and light red. In another embodiment, each of the electroluminescent elements 21 may include only one light emitting unit (e.g., one OLED). In still another embodiment, one of the electroluminescent elements 21 may include only one light emitting unit (e.g., one OLED), and another electroluminescent element 21 may include a plurality of light emitting units (e.g., a plurality of OLEDs).

In some embodiments, an orthographic projection of each of the electroluminescent elements 21 on the touch layer 10 has a same size and shape as a size and shape of a corresponding one of the touch areas 10a. As such, the light exiting area of the electroluminescent element 21 is enlarged as much as possible on the premise that the luminescence of the electroluminescent elements 21 is not affected by each other, thereby facilitating determination of a touch position to be touched by the user in advance.

In some embodiments, as illustrated in FIG. 3, the plurality of electroluminescent elements 21 of the pre-touch feedback module 20 are arranged in a same layer to reduce an overall thickness of the touch panel.

The methods for detecting the touch area 10a opposite to the touch object 30 are not limited in the present disclosure. For example, the methods may include an infrared detection method, an ultrasonic detection method and the like. In some embodiment, each of the touch areas 10a may include at least one self-capacitive electrode 11, as illustrated in FIG. 3, and each self-capacitive electrode 11 is electrically coupled with the pre-touch detection module 50, which is configured to detect the touch area 10a opposite to the touch object 30 based on a change in capacitance of each self-capacitive electrode 11. In some embodiments, the pre-touch detection module 50 determines whether or not a touch object exists within a predetermined distance range above the touch layer 10 based on the change in capacitance of each self-capacitive electrode 11, obtains a position of the touch object 30 when the touch object exists, and then obtains a position of the touch area 10a opposite to the position of the touch object 30, thereby detecting the touch area 10a opposite to the touch object 30. It should be noted that FIG. 3 merely illustrates the pre-touch detection module 50 being electrically coupled with one self-capacitive electrode 11, and the pre-touch detection module 50 is actually electrically coupled with each of the self-capacitive electrodes 11.

In some embodiments, the pre-touch detection module includes a detection sub-module configured to detect the touch object; and a determination sub-module configured to determine, among the plurality of touch areas, a touch area to be touched by the touch object as the touch area opposite to the touch object. In some embodiments, the pre-touch detection module includes a detection sub-module configured to detect the touch object; and a determination sub-module configured to determine, among the plurality of touch areas, a touch area to be touched by the touch object as the touch area opposite to the touch object, based on the change in capacitance of each self-capacitive electrode.

It can be understood that a self-capacitance of the self-capacitive electrode 11 may be changed when the touch object 30 such as a finger or a touch pen is within a range above the self-capacitive electrode 11. When the touch object 30 is in contact with the touch layer 10 so as to perform a touch operation, a change ΔC in capacitance of the self-capacitive electrode 11 at the touch position is relatively large. When a distance between the touch object 30 and the touch layer 10 is within the predetermined distance range, a change in capacitance of the self-capacitive electrode 11 that is right below the location where the touch object 30 is located is within a range, denoted as a predetermined variation range, a maximum value of which is less than ΔC. That is to say, any change in capacitance within the predetermined variation range is not sufficient for completing a touch operation. As such, the pre-touch detection module 50 can determine the position of the touch object 30 by detecting the change in capacitance of the self-capacitive electrode 11 in each touch area 10a, thereby determining the position of the touch area 10a opposite to the position of the touch object 30.

In some embodiments of the present disclosure, as illustrated in FIG. 3, each touch area 10a may be provided with one self-capacitive electrode 11. In this case, when it is detected that a change in capacitance of only one self-capacitive electrode 11 is within the predetermined variation range, the touch area 10a where the one self-capacitive electrode 11 is located can be determined as the touch area 10a opposite to the touch object 30. When it is detected that a change in capacitance of each of a plurality of self-capacitive electrodes 11 is within the predetermined variation range (i.e., in a case where the touch object 30 is located at a boundary of a plurality of touch areas 10a), a touch area 10a in which the self-capacitive electrode 11 having a maximum change in capacitance is located is determined as the touch area 10a opposite to the touch object 30. In some embodiments, each touch area 10a may also be provided with a plurality of self-capacitive electrodes 11, in this case, a sum of changes in capacitance of the self-capacitive electrodes 11 in a same touch area 10a may be detected, and a touch area 10a with a maximum sum of changes in capacitance within the predetermined variation range is determined as the touch area 10a opposite to the touch object 30.

Figure 4:
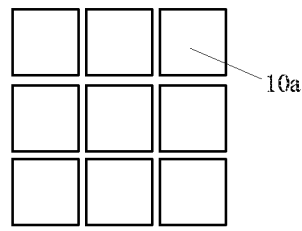
FIG. 4 is a schematic diagram illustrating an arrangement manner of touch areas of a touch layer according to embodiments of the present disclosure.
Figure 5:
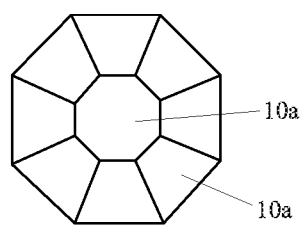
FIG. 5 is a schematic diagram illustrating another arrangement manner of touch areas of a touch layer according to embodiments of the present disclosure.

The shape of the touch panel according to the present disclosure may be of a regular rectangular shape. In some embodiments and as illustrated in FIG. 4, the plurality of touch areas 10a of the touch layer 10 are arranged in rows and columns. Moreover, the shape of the touch panel according to the present disclosure may be of a circular shape (as illustrated in FIG. 2) or may be of an irregular shape such as a polygonal shape as illustrated in FIG. 5. In some embodiments and as illustrated in FIG. 5, the plurality of touch areas 10a of the touch layer 10 are arranged such that one touch area 10a is arranged at a centre of the touch layer 10 (e.g., the centre of the one touch area 10a coincides with or substantially coincides with the centre of the touch layer 10) and the remaining touch areas 10a are arranged to surround the one touch area 10a. Optionally, when an irregular shape is adopted, the touch areas 10a surrounding the central touch area are uniformly distributed and have a same size, so as to ensure that the position of the touch object 30 can be accurately determined.

For simplification of fabrication and ensuring detection accuracy, each touch area 10a has a size between approximately 5 mm to approximately 10 mm in an arbitrary direction parallel to the touch layer 10. As illustrated in FIG. 4, the touch area 10a maybe of a rectangular shape, and each of the length, width and diagonal of the rectangular shape has a size between approximately 5 mm to approximately 10 mm.

Figure 6A:
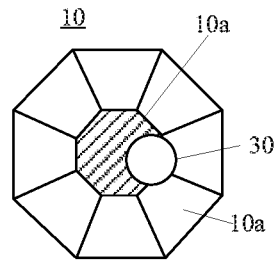
FIGS. 6A and 6B are schematic diagrams illustrating adjustment of a touch object by a user based on light emitted from a pre-touch feedback module.
Figure 6B:
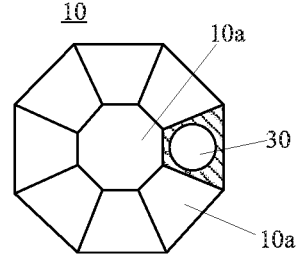

Next, a practical application of the present disclosure will be explained with reference to FIGS. 6A and 6B. FIGS. 6A and 6B are schematic diagrams illustrating adjustment of a touch object by a user based on light emitted from a pre-touch feedback module. In the actual application and as illustrated in FIGS. 6A and 6B, it is assumed that the user intends to perform a touch operation on the touch area 10a on the right side (i.e., the hatched touch area 10a in FIG. 6B) and an actual position of the touch object 30 is at a boundary of adjacent three touch areas 10a (as shown in FIG. 6A) when a distance between the touch object 30 and the touch layer 10 is within the predetermined distance range. At this time, the pre-touch detection module 50 detects that the central touch area 10a is opposite to the touch object 30, i.e., the self-capacitive electrode 11 of the central touch area 10a has a maximum change in capacitance, such that the electroluminescent element 21 corresponding to the central touch area 10a emits light. In this case, the user recognizes that the touch position is to be deviated based on the color and position of the light, so the user can move the touch object 30 rightwards in time to arrive at the position as illustrated in FIG. 6B, thereby preventing a faulty touch from occurring. The hatched touch areas in FIGS. 6A and 6B denote the touch areas corresponding to the electroluminescent elements 21 that emit light.

In the actual applications illustrated by FIG. 6A and FIG. 6B, a display panel (not illustrated) may be provided underneath the touch layer 10. The display panel and the touch layer 10 may be provided in an overlapping manner, and the display panel is provided to be a lower part while the touch layer 10 is provided to be an upper part (e.g., as illustrated in FIG. 3). The display panel may be configured (e.g., by a computer or a processing circuit) to have a plurality of display areas. The plurality of display areas may be in a one-to-one correspondence with the plurality of touch areas, and display respective contents during display (e.g., after the display panel is powered-up and the system built for the display panel is initiated). For example, the respective contents may be functional buttons (e.g., graphical representations of functions such as "music", "navigation" and "air conditioning" arranged in a control panel of a vehicle). That is, each touch area 10a corresponds to one function. When a touch area corresponding to the functional button is being touched, a corresponding function is performed. For example, the functional buttons may be buttons for controlling music playback function, such as "start", "pause", "next", and "previous". When a functional button (a touch area) is being touched, the function (e.g., playing music) corresponding to the functional button is performed. The respective contents in the display areas may be fixed contents, for example, contents pre-programmed in the factory. In some embodiments, one display area (one function) may correspond to multiple touch areas 10a, and in this case, the corresponding function is performed when any one of the multiple touch areas 10a is being touched, and it is possible to set that only one of multiple electroluminescent elements corresponding to the multiple touch areas 10a emits light when an approaching touch object is detected.

In the present disclosure, the number of the touch areas 10a is at least 2, e.g., from 2 to 10, from 10 to 20, from 20 to 30, from 30 to 50, or from 50 to 100. In actual applications, in the case of a small sized display panel, less number of touch areas (e.g., 9 touch areas 10a as illustrated in FIG. 4 and FIG. 5) and associated electroluminescent elements 21 may be provided on the entire area of the display panel. In the case of a large sized display panel, the touch areas 10a and associated electroluminescent elements 21 according to the present disclosure may be provided in at least one part of the display panel, depending on actual needs. In some embodiments of the present disclosure, a plurality of touch area groups may be provided in a plurality of parts of the display panel, and each of the plurality of touch area groups may include multiple touch areas 10a, and the electroluminescent elements corresponding to the multiple touch areas 10a can emit light having different colors. Electroluminescent elements corresponding to two touch areas 10a from different touch area groups may emit light having a same color, as long as the user can distinguish the two touch areas 10a. For example, the two touch areas 10a may be respectively located at two parts of the display panel, which are much far away from each other, so that the user can easily distinguish the two touch areas 10a.

Figures 8A, 8B:
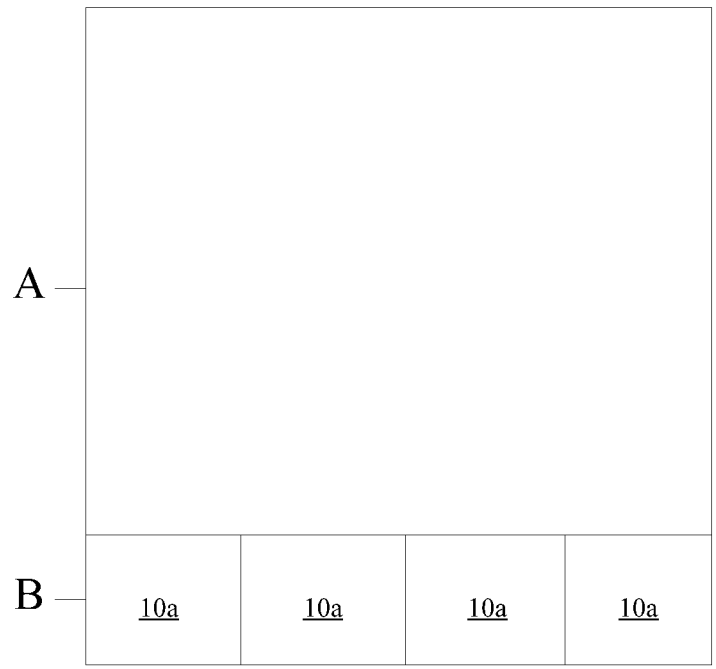
FIG. 8A illustrates an exemplary arrangement of touch areas of a touch panel according to an embodiment of the present disclosure.
FIG. 8B illustrates another exemplary arrangement of touch areas of a touch panel according to an embodiment of the present disclosure.

FIG. 8A illustrates an exemplary arrangement of touch areas of a touch panel according to an embodiment of the present disclosure. As illustrated in FIG. 8A, the touch panel may include a region A and a region B. The region A may correspond to a normal touch region, i.e., a region without the pre-touch feedback module, and the region A may correspond to a region for normal display. The region B corresponds to the touch areas 10a according to embodiments of the present disclosure, i.e., a region having the pre-touch feedback module. In FIG. 8A, the region B includes four touch areas 10a, and electroluminescent elements corresponding to the four touch areas 10a can emit light having different colors. For example, the electroluminescent elements corresponding to the four touch areas 10a may emit blue light, red light, green light and white light, respectively. The four touch areas 10a and the layout of the regions A and B as illustrated in FIG. 8A are merely exemplary, and other number of touch areas 10a and other layout of the regions A and B may be provided. For example, the region B may be one continuous region, or may be a plurality of separate regions.

FIG. 8B illustrates another exemplary arrangement of touch areas of a touch panel according to an embodiment of the present disclosure. As illustrated in FIG. 8B, the touch panel includes 16 touch areas 10a, and the 16 touch areas 10a are throughout the entire touch panel 16. That is, the entire area of the touch panel is divided into 16 regions each corresponding to one of the 16 touch areas 10a. Each touch area 10a corresponds to one electroluminescent element (e.g., electroluminescent element 21 as shown in FIG. 3). Each electroluminescent element may include at least one first color (e.g., red) light emitting unit (e.g., red OLED), at least one second color (e.g., green) light emitting unit (e.g., green OLED) and at least one third color (e.g, blue) light emitting unit (e.g., blue OLED). In this case, each of the electroluminescent elements 21 can emit light having a desired color, and as compared with the touch panel of FIG. 8A, the touch panel of FIG. 8B can realize more colors recognizable by human eyes, such as dark blue and light red. The number of touch areas in FIG. 8B is only exemplary, and any number of touch areas 10a may be provided, as long as they can be recognized and distinguished by human eyes.

In some embodiments of the present disclosure, the touch panel may be integrated with a photodetector for detecting intensity of ambient light. When the detected intensity of ambient light is weak (e.g., the touch panel is in a dark environment), the pre-touch detection module may enable the electroluminescent elements such that a corresponding electroluminescent element emits light upon detection of an approaching touch object. When the detected intensity of ambient light is strong (e.g., the touch panel is in a bright environment), the pre-touch detection module may disable the electroluminescent elements such that a corresponding electroluminescent element does not emit light even upon detection of an approaching touch object. The photodetector may be a photodiode. In some embodiments, the electroluminescent elements may be manually switched off (e.g., through system setting or a mechanical/electronic switch) by the user, such that a corresponding electroluminescent element does not emit light even upon detection of an approaching touch object.

The pre-touch detection module is capable of detecting the touch area opposite to the touch object when the touch object comes into the predetermined distance range above the touch layer, and the pre-touch feedback module is capable of generating a corresponding feedback signal based on the touch area detected by the pre-touch detection module. As such, during the operation of the touch panel provided by the present disclosure, even before a touch object such as a finger or a touch pen comes into contact with the touch layer, an area of the touch layer that is to be touched by the touch object can be detected in advance by the pre-touch detection module, and the pre-touch feedback module generates a corresponding feedback signal, such that the user can recognize in advance which one of the touch areas is to be touched based on the feedback signal. When the touch area is not a touch area that is intentionally to be touched, the user can correct his/her touch action in time to prevent a faulty touch from occurring.

Figure 7:
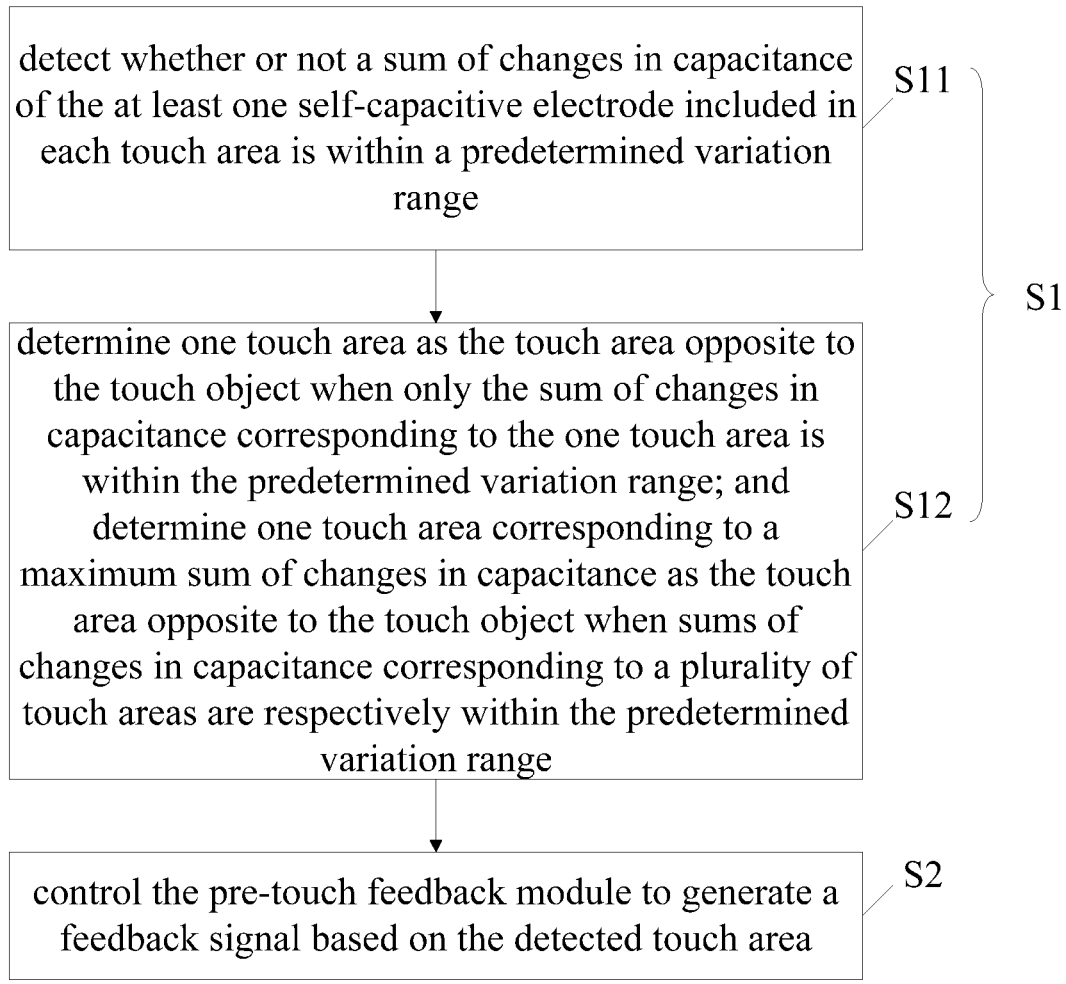
FIG. 7 is a flowchart illustrating a touch method according to embodiments of the present disclosure.

Another aspect of the present disclosure provides a touch method of the above-mentioned touch panel, and the touch method includes a main touch stage and a pre-touch stage prior to the main touch stage. The main touch stage is the same as an existing touch process, i.e., a touch object (e.g., the touch object 30 in FIG. 3) comes into contact with a touch layer, and a touch position is then acquired fir subsequent operations. The present disclosure mainly focuses on the touch process in the pre-touch stage. Referring to FIGS. 3 and 7, the pre-touch stage includes the following steps of S1 and S2.

At step S1, a touch area 10a opposite to a touch object 30 is detected by using a pre-touch detection module 50 when the touch object 30 is at a distance from a touch layer 10, the distance being greater than 0.

At step S2, a pre-touch feedback module 20 is controlled to generate a feedback signal based on the detected touch area 10a. Optionally, the touch signals corresponding to the touch areas 10a are different from each other.

Each touch area 10a includes at least one self-capacitive electrode 11, and each self electrode 11 is electrically coupled with the pre-touch detection module 50. Accordingly, in some embodiments, the step S1 may include the following steps of S11 and S12.

At step S11, whether or not a sum of changes in capacitance of the at least one self-capacitive electrode 11 included in each touch area is within a predetermined variation range is detected. Here, it can be understood that in this step, in a case where the touch area includes only one self-capacitive electrode, the sum of changes in capacitance is the change in capacitance of the one self-capacitive electrode.

At step S12, when the sum of changes in capacitance corresponding to only one touch area 10a is within the predetermined variation range, the one touch area 10a is determined as the touch area 10a opposite to the touch object 30; and when the sums of changes in capacitance corresponding to a plurality of touch areas 10a are respectively within the predetermined variation range, one touch area 10a corresponding to a maximum sum of changes in capacitance is determined as the touch area 10a opposite to the touch object 30. The specific principle thereof is as described above, and will not be repeated here.

As described above, the pre-touch feedback module 20 may include a plurality of electroluminescent elements 21 arranged at a side of the touch layer 10, and the electroluminescent elements 21 are in a one-to-one correspondence with the plurality of touch areas 10a. In this case, the step S2 may include controlling an electroluminescent element 21 corresponding to the detected touch area 10a to emit light.

Another aspect of the present disclosure provides a touch apparatus, including any one of the above-mentioned touch panels provided by the present disclosure. The touch panel is capable of detecting in advance an area of the touch layer that is to be touched by the touch object and generating a corresponding feedback signal, such that during the operation of the touch apparatus including the touch panel, the user can recognize in advance which one of the touch areas is to be touched based on the feedback signal, thereby preventing a faulty touch from occurring. Additionally, since the touch apparatus including the touch panel is capable of preventing the faulty touch from occurring, it is possible to reduce faulty touch operations even when the touch apparatus is used in a complex environment such as an on-board display or a noisy environment, or is provided with an irregular shape. Therefore, the touch apparatus can have a wider application range.

It should be understood that the above implementations are merely exemplary implementations adopted for explaining the principle of the present disclosure, but the present disclosure is not limited thereto. For those skilled in the art, various modifications and improvements may be made without departing from the spirit and essence of the present disclosure, and these modifications and improvements are also considered to be within the protection scope of the present disclosure.

What is claimed is:

1. A touch panel, comprising:
   a touch layer comprising a plurality of touch areas;
   a pre-touch detection module configured to detect, among the plurality of touch areas, a touch area opposite to a touch object, the touch object being at a distance from the touch layer, the distance being greater than 0; and
   a pre-touch feedback module configured to generate a feedback signal based on the detected touch area,
   wherein the feedback signals corresponding to the plurality of touch areas are different;
   wherein the feedback signal comprises an optical signal; wherein the optical signals corresponding to the plurality of touch areas are light having different colors; and
   wherein the pre-touch feedback module comprises a plurality of electroluminescent elements arranged at a side of the touch layer, the electroluminescent elements are in a one-to-one correspondence with the plurality of touch areas, an orthographic projection of each of the plurality of electroluminescent elements on the touch layer is within a corresponding one of the plurality of touch areas, and the plurality of electroluminescent elements emit light having different colors.

2. The touch panel of claim 1, wherein the plurality of touch areas and the plurality of electroluminescent elements are provided in only a part of the touch panel.

3. The touch panel of claim 2, wherein a number of the plurality of touch areas is four.

4. The touch panel of claim 1, wherein the plurality of touch areas and the plurality of electroluminescent elements are provided throughout an entire of the touch panel.

5. The touch panel of claim 1, wherein each of the plurality of touch areas has at least one self-capacitive electrode, each of the at least one self-capacitive electrode is electrically coupled with the pre-touch detection module, and
   the pre-touch detection module is configured to detect the touch area opposite to the touch object based on a change in capacitance of each self-capacitive electrode.

6. The touch panel of claim 5, wherein the pre-touch detection module comprises:
   a detection sub-module configured to detect the touch object; and
   a determination sub-module configured to determine, among the plurality of touch areas, a touch area to be touched by the touch object as the touch area opposite to the touch object, based on the change in capacitance of each self-capacitive electrode.

7. The touch panel of claim 1, further comprising a display panel, wherein
   the touch layer is arranged at a light exiting side of the display panel, and the plurality of electroluminescent elements are arranged between the display panel and the touch layer.

8. The touch panel of claim 7, wherein the display panel is configured to have a plurality of display areas, the plurality of display areas are in a one-to-one correspondence with the plurality of touch areas and display respective contents after a system is initiated.

9. The touch panel of claim 1, wherein the plurality of touch areas are arranged in rows and columns.

10. The touch panel of claim 1, wherein among the plurality of touch areas, one touch area is arranged at a centre of the touch layer while the remaining touch areas are arranged to surround the one touch area.

11. The touch panel of claim 1, wherein the pre-touch detection module comprises:
   a detection sub-module configured to detect the touch object; and
   a determination sub-module configured to determine, among the plurality of touch areas, a touch area to be touched by the touch object as the touch area opposite to the touch object.

12. A touch method of a touch panel, the touch panel comprising a touch layer having a plurality of touch areas, a pre-touch detection module and a pre-touch feedback module, the method comprising:
   detecting, by using the pre-touch detection module, a touch area of the plurality of touch areas opposite to a touch object when the touch object is at a distance from the touch layer, the distance being greater than 0; and
   controlling the pre-touch feedback module to generate a feedback signal based on the detected touch area,
   wherein the feedback signals corresponding to the plurality of touch areas are different;
   wherein the pre-touch feedback module comprises a plurality of electroluminescent elements arranged at a side of the touch layer, the electroluminescent elements are in a one-to-one correspondence with the plurality of touch areas, an orthographic projection of each of the plurality of electroluminescent elements on the touch layer is within a corresponding one of the plurality of touch areas, the plurality of electroluminescent elements emit light having different colors, and
   the controlling the pre-touch feedback module to generate a feedback signal based on the detected touch area comprises controlling one of the plurality of electroluminescent elements corresponding to the detected touch area to emit light.

13. The touch method of claim 12, wherein each of the plurality of touch areas has at least one self-capacitive electrode, each of the at least one self-capacitive electrode being electrically coupled with the pre-touch detection module, and
   the detecting, by using the pre-touch detection module, a touch area of the plurality of touch areas opposite to a touch object comprises:
   detecting whether or not a sum of changes in capacitance of the at least one self-capacitive electrode comprised in each touch area is within a predetermined variation range; and
   determining one touch area as the touch area opposite to the touch object when only the sum of changes in capacitance corresponding to the one touch area is within the predetermined variation range; and determining one touch area corresponding to a maximum sum of changes in capacitance as the touch area opposite to the touch object when sums of changes in capacitance corresponding to a plurality of touch areas are respectively within the predetermined variation range.

14. A touch apparatus, comprising a touch panel,
   wherein the touch panel comprises:
   a touch layer comprising a plurality of touch areas;
   a pre-touch detection module configured to detect, among the plurality of touch areas, a touch area opposite to a touch object, the touch object being at a distance from the touch layer, the distance being greater than 0; and
   a pre-touch feedback module configured to generate a feedback signal based on the detected touch area,
   wherein the feedback signals corresponding to the plurality of touch areas are different;
   wherein the feedback signal comprises an optical signal; and the optical signals corresponding to the plurality of touch areas are light having different colors; and
   wherein the pre-touch feedback module comprises a plurality of electroluminescent elements arranged at a side of the touch layer, the electroluminescent elements are in a one-to-one correspondence with the plurality of touch areas, an orthographic projection of each of the plurality of electroluminescent elements on the touch layer is within a corresponding one of the plurality of touch areas, and the plurality of electroluminescent elements emit light having different colors.

* * * * *